(12) United States Patent
Tanabe et al.

(10) Patent No.: US 11,572,921 B2
(45) Date of Patent: Feb. 7, 2023

(54) SINTERED BEARING AND METHOD FOR MANUFACTURING SINTERED BEARING

(71) Applicant: PORITE CORPORATION, Saitama (JP)

(72) Inventors: Shigeyuki Tanabe, Saitama (JP); Shinobu Aso, Saitama (JP); Hiroshi Nara, Saitama (JP)

(73) Assignee: PORITE CORPORATION, Saitama (JP)

(*) Notice: Subject to any disclaimer, the term of this patent is extended or adjusted under 35 U.S.C. 154(b) by 0 days.

(21) Appl. No.: 16/965,781

(22) PCT Filed: Jan. 25, 2019

(86) PCT No.: PCT/JP2019/002584
§ 371 (c)(1),
(2) Date: Jul. 29, 2020

(87) PCT Pub. No.: WO2019/146770
PCT Pub. Date: Aug. 1, 2019

(65) Prior Publication Data
US 2021/0040989 A1    Feb. 11, 2021

(30) Foreign Application Priority Data

Jan. 29, 2018  (JP) .............................. JP2018-012184

(51) Int. Cl.
*F16C 33/14*    (2006.01)
*B22F 3/00*    (2021.01)
(Continued)

(52) U.S. Cl.
CPC .............. *F16C 33/14* (2013.01); *B22F 3/004* (2013.01); *B22F 3/12* (2013.01); *B22F 3/26* (2013.01);
(Continued)

(58) Field of Classification Search
CPC . C22C 9/04; C22C 9/06; C22C 1/0425; F16C 2204/10; F16C 2204/14
(Continued)

(56) References Cited

U.S. PATENT DOCUMENTS 5,344,606 A * 9/1994 Brimmer .................. C22C 9/04
                                                     148/434
5,972,070 A * 10/1999 Kondoh ................ B22F 1/0003
                                                     75/255
(Continued)

FOREIGN PATENT DOCUMENTS

CN       105215363 A  *  1/2016
GB       2386610 A    *  9/2003   ............ F16C 33/121
(Continued)

OTHER PUBLICATIONS

Donoso E., et al. "Isothermal Characterization of the Precipitation Hardening of a Cu—11Ni—19Zn—1Sn Alloy", The Minerals, Metals, & Materials Society and ASM International; vol. 48A, p. 3090-3095 (Year: 2017).*
(Continued)

*Primary Examiner* — Alexandra M Moore
*Assistant Examiner* — Austin Pollock
(74) *Attorney, Agent, or Firm* — Wenderoth, Lind & Ponack, L.L.P.

(57) ABSTRACT

A sintered bearing is made of a sintered compact containing nickel silver (Cu—Ni—Zn) as a base. In the sintered bearing, P is not added in the sintered compact. Alternatively, a content of P in the sintered compact is less than 0.05 mass % in terms of mass ratio to a total mass. Consequently, crystal grains constituting the sintered compact can be micronized. In particular, in the sintered bearing, an average crystal particle diameter of the crystal grains constituting the sintered compact is 20 μm or less. Consequently, the
(Continued)

mechanical strength and the vibration resisting properties can be improved, and the rotation shaft can be prevented from being damaged.

4 Claims, 9 Drawing Sheets

(51) Int. Cl.
  *B22F 3/12* (2006.01)
  *B22F 3/26* (2006.01)
  *F16C 33/12* (2006.01)
  *C22C 9/06* (2006.01)
  *C22C 9/04* (2006.01)
  *C22C 1/04* (2006.01)
  *B22F 3/16* (2006.01)

(52) U.S. Cl.
  CPC ............ *C22C 9/04* (2013.01); *C22C 9/06* (2013.01); *F16C 33/12* (2013.01); *B22F 2003/166* (2013.01); *B22F 2301/10* (2013.01); *B22F 2304/10* (2013.01); *C22C 1/0425* (2013.01); *F16C 2204/10* (2013.01); *F16C 2204/14* (2013.01)

(58) Field of Classification Search
  USPC .................................. 148/481, 485
  See application file for complete search history.

(56) References Cited

U.S. PATENT DOCUMENTS

| 6,524,365 | B1* | 2/2003 | Kanezaki | ............ C22C 9/04 75/243 |
| 7,479,174 | B2* | 1/2009 | Shimizu | ............ F04C 2/084 418/179 |
| 2002/0197149 | A1* | 12/2002 | Kanezaki | ............ C22C 32/0089 415/55.1 |
| 2013/0052480 | A1 | 2/2013 | Tujimoto et al. | |
| 2014/0376845 | A1* | 12/2014 | Takezoe | ............ C22C 1/08 384/279 |

FOREIGN PATENT DOCUMENTS

| JP | 05311290 A | * 11/1993 |
| JP | 2013-49887 | 3/2013 |
| JP | 2015-187307 | 10/2015 |

OTHER PUBLICATIONS

International SearchReport dated Mar. 19, 2019 in International (PCT) Application No. PCT/JP2019/002584.

* cited by examiner

Fig. 3

| | Cu-14Ni-14Zn-2Sn ALLOY POWDER | Cu-14Ni-14Zn-2Sn-0.03P ALLOY POWDER | Cu-18Ni-18Zn ALLOY POWDER | Cu-11Sn ALLOY POWDER | Cu-8P ALLOY POWDER | GRAPHITE POWDER (SOLID LUBRICANT) |
|---|---|---|---|---|---|---|
| EXAMPLE 1 | 97.5 | — | — | — | — | 2.5 |
| EXAMPLE 2 | 96.5 | — | — | — | — | 3.5 |
| EXAMPLE 3 | 99.4 | — | — | — | — | 0.6 |
| EXAMPLE 4 | — | 97.5 | — | — | — | 2.5 |
| COMPARATIVE EXAMPLE 1 | — | — | 75.5 | 20.0 | 2.0 | 2.5 |
| COMPARATIVE EXAMPLE 2 | — | — | 73.5 | 20.0 | 2.0 | 4.5 |
| COMPARATIVE EXAMPLE 3 | — | — | 50.0 | 45.5 | 2.0 | 2.5 |
| COMPARATIVE EXAMPLE 4 | — | — | 93.5 | — | 4.0 | 2.5 |

Fig. 4

|  | Cu | Ni | Zn | Sn | P | C |
|---|---|---|---|---|---|---|
| EXAMPLE 1 | 68.3 | 13.7 | 13.7 | 2.0 | — | 2.5 |
| EXAMPLE 2 | 67.6 | 13.5 | 13.5 | 1.9 | — | 3.5 |
| EXAMPLE 3 | 69.6 | 13.9 | 13.9 | 2.0 | — | 0.6 |
| EXAMPLE 4 | 68.3 | 13.7 | 13.7 | 2.0 | 0.03 | 2.5 |
| COMPARATIVE EXAMPLE 1 | 68.0 | 13.6 | 13.6 | 2.2 | 0.2 | 2.5 |
| COMPARATIVE EXAMPLE 2 | 66.7 | 13.2 | 13.2 | 2.2 | 0.2 | 4.5 |
| COMPARATIVE EXAMPLE 3 | 74.3 | 9.0 | 9.0 | 5.0 | 0.2 | 2.5 |
| COMPARATIVE EXAMPLE 4 | 63.5 | 16.8 | 16.8 | — | 0.3 | 2.5 |

EXAMPLE 1

EXAMPLE 4

Fig. 9

|  | CORROSION RESISTANCE | RADIAL CRUSHING STRENGTH | VIBRATION RESISTING PROPERTIES | FRICTION COEFFICIENT |
|---|---|---|---|---|
| EXAMPLE 1 | ◎ | ○ | ○ | ○ |
| EXAMPLE 2 | ◎ | △ | ○ | ◎ |
| EXAMPLE 3 | ◎ | ◎ | ○ | △ |
| EXAMPLE 4 | ◎ | ○ | ○ | ○ |
| COMPARATIVE EXAMPLE 1 | △ | △ | × | △ |
| COMPARATIVE EXAMPLE 2 | △ | × | × | ○ |
| COMPARATIVE EXAMPLE 3 | × | ○ | × | × |
| COMPARATIVE EXAMPLE 4 | △ | × | × | △ |

SINTERED BEARING AND METHOD FOR MANUFACTURING SINTERED BEARING

TECHNICAL FIELD

The present invention relates to a sintered bearing and a method for manufacturing a sintered bearing, and more particularly to a sintered bearing suitable for application in a motor for a liquid pump and a method for manufacturing this sintered bearing.

BACKGROUND ART

As a liquid transportation pump (which will be referred to as a "liquid pump" hereinafter), various kinds of pumps have been known.

For example, a liquid pump mounted in an automobile, a water pump configured to circulate cooling water for engine cooling, a washer liquid pump configured to discharge a window washer liquid, an oil pump configured to produce a hydraulic pressure in a hydraulic mechanism, an oil pump configured to pump an engine oil, a fuel pump configured to supply a fuel (gasoline, gas oil, alcohol, and others), or the like is known.

In recent years, in view of stabilization of a discharge quantity (a pumpage), motorization of liquid pumps to obtain power from electric motors has been advancing.

For example, in conventional liquid pumps, since the power is obtained from an engine, there is a problem that a change in engine speed affects a discharge quantity of cooling water and cooling efficiency becomes unstable. Thus, in recent water pumps, obtaining the power from an electric motor achieves stabilization of a discharge quantity and stabilization of the cooling efficiency. In particular, in a water pump mounted in a hybrid car, an electric-powered car, a fuel-cell car, or the like, the power cannot be obtained from an engine. Alternatively, since the stabilized power cannot be obtained from the engine, motorization for obtaining the power from an electric motor has been advancing to obtain a stable discharge quantity.

In particular, to attain miniaturization and high output of the liquid pumps, miniaturization and high output of the electric motors have being advancing and, in accordance with this, a load imposed on a bearing included in each electric motor has been increasing. Thus, as to the bearing included in the electric motor arranged in the liquid pump (which will be referred to as a "bearing for the liquid pump" hereinafter), an improvement in load bearing properties is demanded. Furthermore, since the bearing for the liquid pump is used in a liquid, an improvement in water resisting properties/corrosion resisting properties, as well as the improvement in load bearing properties, is demanded.

As a bearing which is excellent in water resisting properties/corrosion resisting properties, a bearing made of ceramics, carbon, or resin has been conventionally known. However, the bearing made of ceramics or carbon is excellent in the water resisting properties/corrosion resisting properties, but it has a problem of a high machining cost. Moreover, the bearing made of resin has a problem that assuring a dimension accuracy is difficult and the load bearing properties are insufficient.

On the other hand, as a bearing excellent in the load bearing properties, a sintered bearing made by sintering metal powder has been known. However, the sintered bearing has a problem in that it has poor water resisting properties/corrosion resisting properties and is not suitable for use in water. In particular, when the sintered bearing is used in water, it has a problem that its sliding properties become insufficient.

Thus, in recent years, as a bearing for the liquid pump, a sintered bearing made of a basis material (a base material) having nickel silver (a Cu—Ni—Zn alloy) which is a material superior in the water resisting properties/corrosion resisting properties, P (phosphorous), and a solid lubricant added therein has been developed (see Japanese Unexamined Patent Application Publication No. 2015-18730).

In the sintered bearing described in Japanese Unexamined Patent Application Publication No. 2015-18730, since the nickel silver is used as a base in the basis material, the sliding properties are improved by graphite (the solid lubricant) added in the basis material while improving the water resisting properties/corrosion resisting properties.

In particular, in the sintered bearing described in Japanese Unexamined Patent Application Publication NO. 2015-18730, diffusion of other added constituent elements (Ni, Zn, and the like) is promoted at the time of sintering by adding P in the basis material, and generation of portions with the poor water resisting properties/corrosion resisting properties is suppressed in the sintered bearing.

However, the conventional sintered bearing has a fear of a reduction in mechanical strength and vibration resisting properties.

That is, in the conventional sintered bearing, since P is added in the basis material, crystal grains constituting the basis material are prone to coarsen at the time of sintering. Additionally, when the crystal grains constituting the basis material coarsen, there is a fear of a reduction in mechanical strength and vibration resisting properties.

Further, the conventional sintered bearing also has a fear of damaging a rotation shaft.

That is, in the conventional sintered bearing, since P is added in the basis material, an alloy layer of Ni—Sn—P is readily precipitated in the basis material. Here, the alloy layer of Ni—Sn—P has hardness which is extremely higher than those of other portions in the basis material. Thus, in the basis material, when the alloy layer of Ni—Sn—P has been precipitated, the contact of the rotation shaft with the alloy layer of Ni—Sn—P at the time of shaft rotation may possibly result in damage to the rotation shaft.

A problem of the present invention is to improve the mechanical strength and the vibration resisting properties in the sintered bearing and prevent the rotation shaft from being damaged.

Solution to Problem

To solve the problem, a sintered bearing according to a first invention is characterized by comprising a sintered compact which has a composition containing, in terms of mass ratio to a total mass, Ni which exceeds 10 mass % and is less than 20 mass %, Zn which exceeds 13 mass % and is less than 20 mass %, Sn which exceeds 0.5 mass % and is less than 3 mass %, and a solid lubricant which exceeds 0.5 mass % and is less than 4 mass %, and having a remaining part consisting of Cu and inevitable impurities, the sintered compact having an average crystal particle diameter which is 20 μm or less.

Further, a sintered bearing according to a second invention is characterized by including a sintered compact which has a composition containing, in terms of mass ratio to a total mass, Ni which exceeds 10 mass % and is less than 20 mass %, Zn which exceeds 13 mass % and is less than 20 mass %, Sn which exceeds 0.5 mass % and is less than 3 mass %, a solid lubricant which exceeds 0.5 mass % and is less than 4 mass %, and P which is less than 0.05 mass %, and having a remaining part consisting of Cu and inevitable impurities, the sintered compact having an average crystal particle diameter which is 20 μm or less.

In the sintered bearing according to the first or second invention, the sintered compact is formed using nickel silver (Cu—Ni—Zn) as a base. Consequently, the water resisting properties/corrosion resisting properties can be improved.

Furthermore, in the sintered bearing according to the first or second invention, the sintered compact contains the solid lubricant. Consequently, the sliding properties can be improved.

Moreover, in the sintered bearing according to the first or second invention, Sn is contained in the sintered compact (a green compact). Consequently, sinterability can be enhanced, and sintering strength can be improved. As a result, the sintering strength which is lowered due to inclusion of the solid lubricant can be supplemented. Additionally, in the sintered compact, since Sn is contained, dezincification corrosion resistance in water can be improved.

In particular, in the sintered bearing according to the first invention, P is not contained in the sintered compact. Further, in the sintered bearing according to the second invention, a content of P in the sintered compact is less than 0.05 mass % in terms of mass ratio to a total mass.

Consequently, crystal grains constituting the sintered compact can be micronized, whereby the mechanical strength and the vibration resisting properties can be improved. Furthermore, in the sintered compact, the precipitation of an alloy layer of Ni—Sn—P can be suppressed, and a rotation shaft can be prevented from being damaged during the shaft rotation.

Moreover, in the sintered bearing according to the first or second invention, the average crystal particle diameter of the crystal grains constituting the sintered compact having a crystal structure is 20 μm or less.

Here, when the average crystal particle diameter of the crystal gains constituting the sintered compact exceeds 20 μm, there is a risk that the mechanical strength and the vibration resisting properties required for the sintered bearing arranged in a motor of a liquid pump (a liquid pump mounted in an automobile in particular) are not met.

Thus, setting the average crystal particle diameter of the crystal grains constituting the sintered compact to 20 μm or less enables meeting the mechanical strength and the vibration resisting properties required for the sintered bearing arranged in a motor of a liquid pump (a liquid pump mounted in an automobile in particular).

Thus, according to the sintered bearing of the first or second invention, the mechanical strength and the vibration resisting properties can be improved, and the rotation shaft can be prevented from being damaged.

Here, in the sintered bearing according to the first or second invention, the sintered compact is preferably formed with the use of Cu—Ni—Zn—Sn alloy powder. Specifically, the sintered compact is preferably formed with the use of material powder produced by mixing material powders containing the Cu—Ni—Zn—Sn alloy powder and solid lubricant powder.

That is, in the Cu—Ni—Zn—Sn alloy powder, respective components (constituent elements) such as Ni or Zn are uniformly dispersed in respective particles constituting the powder. Thus, forming the sintered compact with the use of the Cn—Ni—Zn—Sn alloy powder enables preventing the concentration of each component such as Ni or Zn from becoming nonuniform in the sintered compact and thereby avoiding occurrence of a situation where portions in the sintered compact with the low Ni and Zn concentration are selectively eroded.

A detailed description will now be given below on functions/effects of each element constituting the sintered compact (a basis material).

It is to be noted that, in the present invention, a content of each element is identified by a mass ratio (mass %) in the entire sintered compact.

[About Ni (Nickel)]

Since Ni is contained in the sintered compact, the water resisting properties/corrosion resisting properties can be improved.

On this occasion, when a content of Ni in the sintered compact becomes 10 mass % or less, the water resisting properties/corrosion resisting properties become insufficient. On the other than, when the content of Ni in the sintered compact becomes 20 mass % or more, a material cost increases.

Thus, setting the content of Ni in the sintered compact to exceed 10 mass % and become less than 20 mass % enables improving the water resisting properties/corrosion resisting properties while suppressing an increase in material cost.

[About Zn (Zinc)]

Since Zn is contained in the sintered compact, the water resisting properties/corrosion resisting properties can be improved.

On this occasion, when a content of Zn in the sintered compact becomes 13 mass % or less, the water resisting properties/corrosion resisting properties become insufficient. On the other hand, when the content of Zn in the sintered compact becomes 20 mass % or more, the productivity is lowered due to evaporation of zinc at the time of sintering, and a risk of dezincification corrosion increases.

Thus, setting the content of Zn in the sintered compact to exceed 13 mass % and become less than 20 mass % enables improving the water resisting properties/corrosion resisting properties while suppressing a reduction in productivity.

In particular, Zn is a material cheaper than Ni. Thus, to improve the water resisting properties/corrosion resisting properties, increasing the content of Zn while suppressing an increase in the content of Ni enables suppressing an increase in material cost.

[About Sn (Tin)]

Since Sn is contained in the sintered compact (a green compact), the sinterability can be enhanced, and the sintering strength can be improved. Further, even if a content is small, the dezincification corrosion can be suppressed.

On this occasion, when a content of Sn in the sintered compact becomes 0.5 mass % or less, the above-described effects become insufficient. On the other hand, when the content of Sn in the sintered compact becomes 3 mass % or more, distortions due to a change in dimension at the time of sintering are apt to be produced.

Thus, setting the content of Sn in the sintered compact to exceed 0.5 mass % and become less than 3 mass % enables improving the sintering strength while suppressing production of the distortions.

[About Solid Lubricant]

Since the solid lubricant is contained in the sintered content, lubricity can be enhanced, a friction coefficient can be decreased, and seizing properties and abrasion resisting properties can be improved.

On this occasion, when a content of the solid lubricant in the sintered compact becomes 0.5 mass % or less, the above-described effects become insufficient. On the other hand, when the content of the solid lubricant in the sintered compact becomes 4 mass % or more, the sintering strength is extremely lowered.

Thus, setting the content of the solid lubricant in the sintered compact to exceed 0.5 mass % and become less than 4 mass % enables improving the abrasion resisting properties while suppressing a decrease in the sintering strength.

[About P (Phosphorous)]

Since P is contained in the sintered compact, oxidation of metals composing the sintered compact can be avoided.

That is, as will be described later, when producing the material powder forming the sintered compact, it is preferred to use, as the material powder, alloy powder, e.g., the Cu—Ni—Zn—Sn alloy powder.

Here, the alloy powder, e.g., the Cu—Ni—Zn—Sn alloy powder is manufactured by an atomizing method or the like. Specifically, a molten metal in which various types of metals as raw materials composing the target alloy powder have been molten at high temperature is produced, and the produced molten metal is powdered by atomization/rapid solidification, thereby manufacturing the alloy powder.

At this moment, adding a small amount of P as a deoxidizer to the metals as raw materials enables avoiding oxidation of the molten metal.

Here, when a content of P in the metals as raw materials becomes 0.05 mass % or more, the crystal grains constituting the sintered compact are prone to coarsen at the time of sintering, and an alloy layer of Ni—Sn—P is readily precipitated in the sintered compact.

Thus, setting the content of P in the metals as raw materials (the sintered compact) to be less than 0.05 mass % enables avoiding the oxidation of the molten metal while suppressing the coarsening of the crystal grains constituting the sintered compact and the precipitation of the alloy layer of Ni—Sn—P in the sintered compact.

[About Average Crystal Particle Diameter]

When the average crystal particle diameter of the crystal grains constituting the sintered compact having a crystal structure (a microstructure) exceeds 20 μm, there is a risk that the mechanical strength and the vibration resisting properties required for the sintered bearing arranged in a motor of a liquid pump (a liquid pump mounted in an automobile in particular) are not met.

Hereupon, setting the average crystal particle diameter of the crystal grains constituting the sintered compact having the crystal structure to 20 μm or less enables meeting the mechanical strength and the vibration resisting properties required for the sintered bearing arranged in a motor of a liquid pump (a liquid pump mounted in an automobile in particular).

[About Intercommunicating Porosity]

Here, in the sintered bearing according to the first or second invention, intercommunicating porosity in the sintered compact is preferably set to 8 volume % or more and 18 volume % or less.

That is, when the intercommunicating porosity becomes less than 8 volume %, extremely high density is achieved, a pressure required in compacting increases, and the productivity is lowered. On the other hand, when the intercommunicating porosity exceeds 18 volume %, the strength of the green compact is lowered, and hence handling from the beginning to the sintering becomes difficult. Furthermore, since the sintering strength is lowered, the minimum strength required for the bearing cannot be obtained.

Thus, setting the intercommunicating porosity to 8 volume % or more and 18 volume % or less enables improving the sintering strength while suppressing a decrease in productivity.

A sintered bearing according to a third invention is characterized in that, in the sintered bearing according to the first or second invention, the solid lubricant contains at least one of graphite, molybdenum disulfide, and boron nitride.

According to the sintered bearing of the second invention, the lubricity can be improved.

A sintered bearing according to a fourth invention is characterized in that, in the sintered bearing according to anyone of the first to third inventions, the sintered compact is impregnated with a lubricant.

According to the sintered bearing of the fourth invention, in a period from manufacture of the bearing to assembling of a motor or a period from the same to use of the motor, generation of rust on the bearing can be prevented by the impregnating lubricant. Moreover, when a bearing portion is sealed and separated from a flow path for a liquid to be transported, an oil film can be formed between the flow path and a rotation shaft in accordance with rotations of the rotation shaft, and frictional resistance produced between the flow path and the rotation shaft can be reduced. Additionally, even when the bearing portion is used in the liquid to be transported without being sealed, the lubricant impregnating the bearing body is eventually replaced with the liquid to be transported, but using the lubricant having higher viscosity than that of the liquid to be transported enables aiding in lubrication on an initial stage of operation.

In the sintered bearing according to any one of the first to fourth inventions, the sintered bearing according to a fifth invention is characterized by being used for a motor of a liquid pump.

According to the sintered bearing of the fifth invention, the durability of the liquid pump can be improved.

A method for manufacturing a sintered bearing according to a sixth invention is a method for manufacturing a sintered hearing including: a step of mixing a plurality of types of powders to generate material powder; a step of compression-molding the material powder to form a green compact; a step of sintering the green compact to form a sintered compact; and a step of performing sizing to the sintered compact, in which the plurality of types of powders include Cu—Ni—Zn—Sn alloy powder and a solid lubricant, the material powder has a composition containing, in terms of mass ratio to a total mass, Ni which exceeds 10 mass % and is less than 20 mass %, Zn which exceeds 13 mass % and is less than 20 mass %, Sn which exceeds 0.5 mass % and is less than 3 mass %, and a solid lubricant which exceeds 0.5 mass % and is less than 4 mass %, having a remaining part consisting of Cu and inevitable impurities, and an average crystal particle diameter of the sintered compact is 20 μm or less.

Further, a method for manufacturing a sintered bearing according to a seventh invention is a method for manufacturing a sintered bearding including: a step of mixing a plurality of types of powders to generate material powder; a step of compression-molding the material powder to form a green compact; a step of sintering the green compact to form a sintered compact; and a step of performing sizing to the sintered compact, in which the plurality of types of powders include Cu—Ni—Zn—Sn alloy powder, a solid lubricant, and P powder, the material powder has a composition containing, in terms of mass ratio to a total mass, Ni which exceeds 10 mass % and is less than 20 mass %, Zn which exceeds 13 mass % and is less than 20 mass %, Sn which exceeds 0.5 mass % and is less than 3 mass %, a solid lubricant which exceeds 0.5 mass % and is less than 4 mass %, and P which is less than 0.05 mass %, and having a remaining part consisting of Cu and inevitable impurities, and an average crystal particle diameter of the sintered compact is 20 μm or less.

In the method for manufacturing a sintered bearing according to the sixth or seventh invention, the sintered bearing is made of the material powder containing the nickel silver (Cu—Ni—Zn) as a base. Consequently, the water resisting properties/corrosion resisting properties of the sintered bearing can be improved.

Furthermore, in the method for manufacturing a sintered bearing according to the sixth or seventh invention, the solid lubricant is added in the material powder. Consequently, the sliding properties of the sintered bearing can be improved.

Moreover, in the method for manufacturing the sintered bearing according to the sixth or seventh invention, Sn is added in the material powder. Consequently, the sinterability in the sintering can be enhanced, the sintering strength of the sintered bearing can be improved, and the sintering strength which is lowered due to addition of the solid lubricant can be thereby supplemented. Additionally, in the material powder, since Sn is added, the dezincification corrosion resistance in water can be improved.

In particular, in the method for manufacturing a sintered bearing according to the sixth invention, P is not added in the material powder. Further, in the method for manufacturing a sintered bearing according to the seventh invention, an addition amount of P in the material powder is less than 0.05 mass % in terms of mass ratio to a total mass.

Consequently, the crystal grains constituting the sintered compact can be micronized, whereby the mechanical strength and the vibration resisting properties can be improved. Furthermore, in the sintered compact, precipitation of an alloy layer of Ni—Sn—P can be suppressed, and a rotation shaft can be prevented from being damaged at the time of shaft rotation.

Moreover, in the method for manufacturing a sintered bearing according to the sixth or seventh invention, the average crystal particle diameter of the crystal grains constituting the sintered compact having the crystal structure is 20 μm or less.

Consequently, the mechanical strength and the vibration resisting properties required for the sintered bearing arranged in a motor of a liquid pump (a liquid pump mounted in an automobile in particular) can be met.

Additionally, in the method for manufacturing a sintered bearing according to the six or seventh invention, the Cu—Ni—Zn—Sn alloy powder is included in a plurality of types of powders.

Here, in the Cu—Ni—Zn—Sn alloy powder, respective components (constituent elements) such as Ni or Zn are uniformly dispersed in respective particles constituting the powder.

Consequently, forming a sintered compact with the use of the Cu—Ni—Zn—Sn alloy powder enables preventing concentration of each component such as Ni or Zn from becoming nonuniform in the sintered compact and thereby avoiding occurrence of a situation where portions in the sintered compact with the low Ni and Zn concentration are selectively eroded.

Thus, according to the method for manufacturing a sintered bearing of the sixth or seventh invention, the mechanical strength and the vibration resisting properties can be improved, and the rotation shaft can be prevented from being damaged.

Here, the functions/effects of each element constituting the material powder are the same as the functions/effects of each element constituting the sintered compact according to the first or second invention.

Advantageous Effects of Invention

According to the sintered bearing and the method for manufacturing a sintered bearing of the present invention, the mechanical strength and the vibration resisting properties can be improved, and the rotation shaft can be prevented from being damaged.

BRIEF DESCRIPTION OF DRAWINGS

FIG. 3 is a view comparing compounding contents of material powders of sintered bearings according to Examples 1 to 4 with compounding contents of material powders of sintered bearings according to Comparative Examples 1 to 4.

FIG. 4 is a view comparing compositions of the material powders (sintered compacts) of the sintered bearings according to Examples 1 to 4 with compositions of the material powders (sintered compacts) of the sintered bearings according to Comparative Examples 1 to 4;

FIG. 9 is a view comparing characteristics of the sintered bearings according to Examples 1 to 4 with characteristics of the sintered bearings according to Comparative Examples 1 to 4.

ADVANTAGEOUS EFFECTS OF INVENTION

A sintered bearing 20 according to an embodiment of the present invention will now be described hereinafter with reference to the drawings.

A sintered bearing 20 can be applied to electric motors for various kinds of liquid pumps.

The various kinds of liquid pumps include a water pump configured to circulate cooling water for engine cooling, a washer liquid pump configured to discharge a window washer liquid, an oil pump configured to produce a hydraulic pressure in a hydraulic mechanism, an oil pump configured to pump an engine oil, a fuel pump configured to supply a fuel (gasoline, gas oil, alcohol, and others), and the like.

In this embodiment, the sintered bearing 20 is applied to an electric motor for a water pump 1.
(Structure of Water Pump 1)

A description will be first given on an outline structure of the water pump 1.

Figure 1:
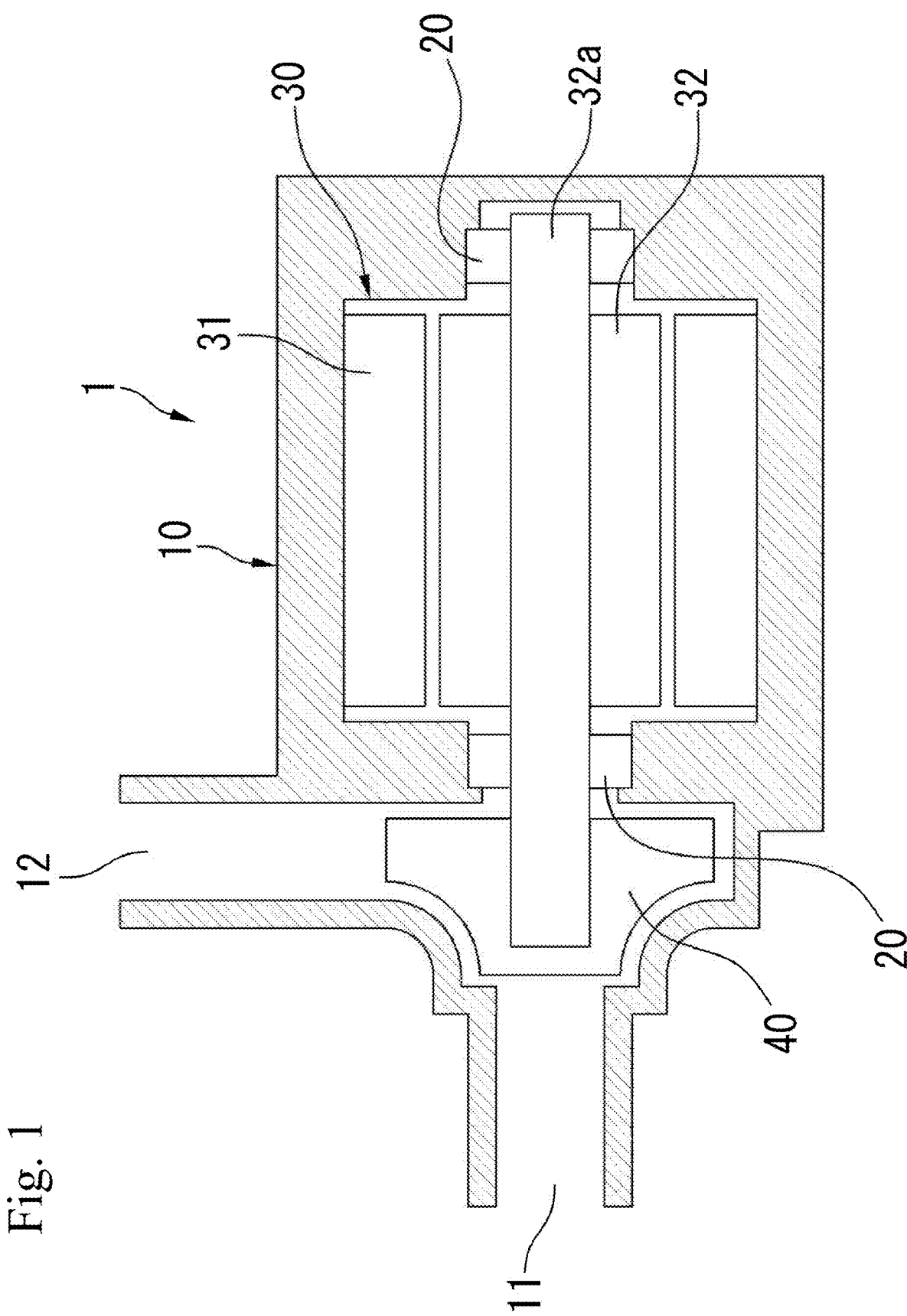
FIG. 1 is a cross-sectional view showing a schematic structure of a water pump 1.
Figure 2:
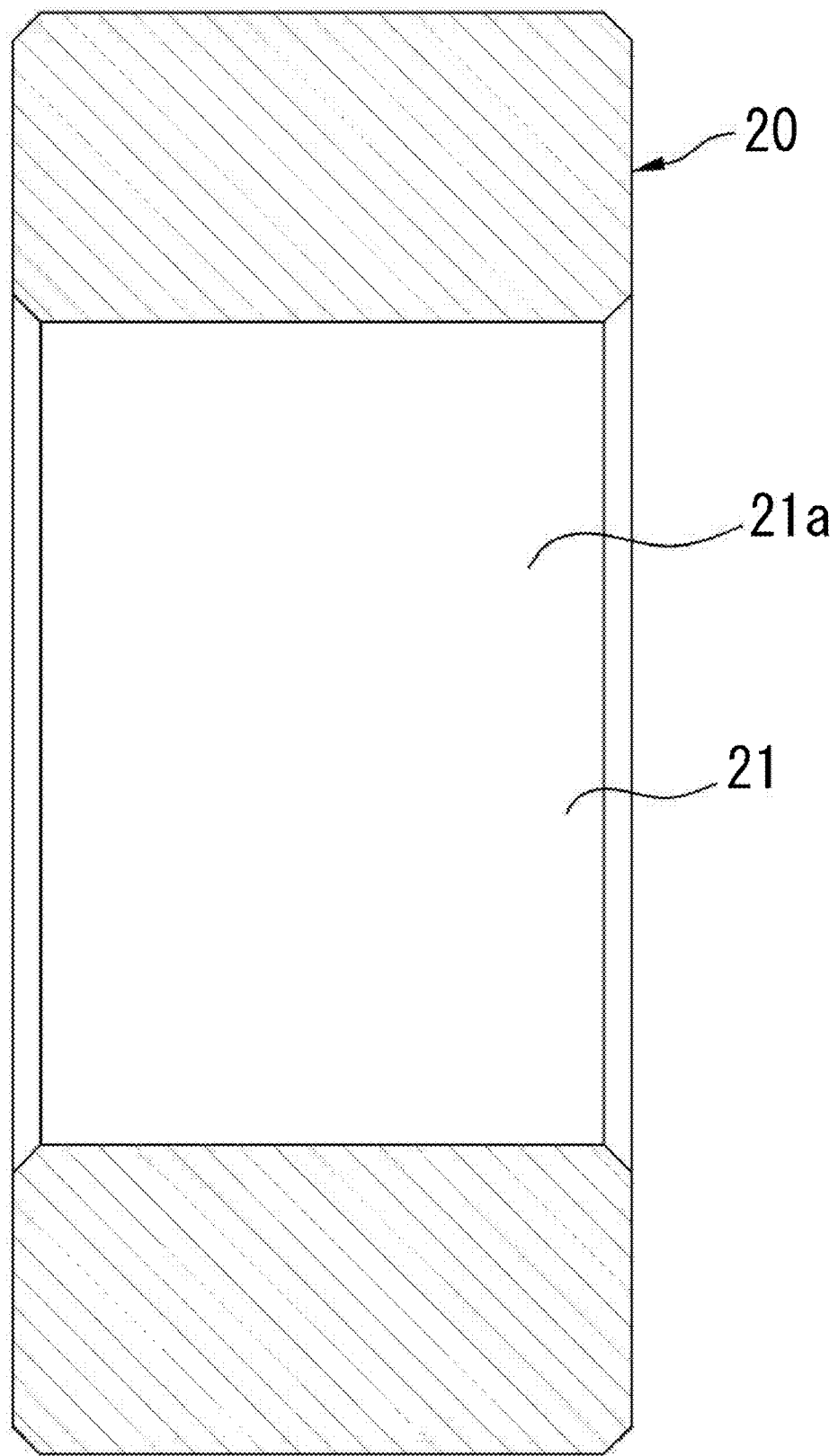
FIG. 2 is a cross-sectional view of a sintered bearing 20.

FIG. 1 is a cross-sectional view showing an outline structure of the water pump 1. FIG. 2 is a cross-sectional view of a sintered bearing 20.

The water pump 1 is a pump configured to supply cooling water (a coolant) cooled by a radiator to a water jacket (a water passage) provided in an engine.

The water pump 1 shown in FIG. 1 is constituted to include a casing 10, a pair of sintered bearings 20, a motor (an electric motor) 30, an impeller 40.

The casing 10 has a suction port 11 from which the cooling water is sucked and a discharge port 12 from which the cooling water is discharged. The suction port 11 is connected to the radiator through a hose (not shown). The discharge port 12 is connected to the water jacket through a hose (not shown).

Each sintered bearing 20 is fixed to the inside of the casing 10. As shown in FIG. 2, each sintered bearing 20 is formed into a substantially cylindrical shape. Each sintered bearing 20 has a bearing hole 21 into which a rotation shaft 32a of a later-described motor 30 is inserted. In each sintered bearing 20, the bearing hole 21 is provided to pierce along a central axis. Further, in each sintered bearing 20, a rotation shaft 32a is supported by an inner peripheral surface of the bearing hole 21 (which will be referred to as a "bearing surface 21a" hereinafter).

The motor 30 has a stator 31 and a rotor 32. Furthermore, the rotor 32 has the rotation shaft 32a. The rotation shaft 32a is inserted into the bearing hole 21 of each sintered bearing 20. That is, one end portion of the rotation shaft 32a is supported by one sintered bearing 20, and the other end portion of the same is supported by the other sintered bearing 20. Consequently, the rotation shaft 32a is rotatably supported by the pair of sintered bearings 20.

The impeller 40 is fixed to the one end portion of the rotation shaft 32a.

In the water pump 1, when the impeller 40 rotates by driving of the motor 30, the cooling water is sucked from the suction port 11, and the sucked cooling water is discharged from the discharge port 12. Consequently, the water pump 1 circulates the cooling water between the radiator and the water jacket.

(Structure of Sintered Bearing 20)

A description will now be given on particulars of a structure of each sintered bearing 20.

The sintered bearing 20 is constituted to include a porous sintered compact (a basis material) and a lubricant with which the sintered body is impregnated.

The sintered compact is a sintered metal. Consequently, the sintered compact is constituted to have a porous constitution (a porous structure) (see FIG. 5). Moreover, the sintered compact is constituted to have a crystal structure (a microstructure). In particular, a solid lubricant is dispersed in the sintered compact.

Specifically, the sintered compact is made of a Cu—Ni—Zn—Sn alloy.

In this embodiment, the sintered compact has a composition containing, in terms of mass ratio to a total mass, Ni which exceeds 10 mass % and is less than 20 mass %, Zn which exceeds 13 mass % and is less than 20 mass %, Sn which exceeds 0.5 mass % and is less than 3 mass %, and a solid lubricant which exceeds 0.5 mass % and is less than 4 mass %, and having a remaining part composed of Cu and inevitable impurities.

Here, in the sintered compact, a configuration containing a small amount of P may be adopted. That is, the sintered compact may be constituted of a Cu—Ni—Zn—Sn—P alloy.

When such a configuration is adopted, a content of the P in the sintered compact is less than 0.05 mass % or preferably less than 0.04 mass % in terms of mass ratio to a total mass.

That is, the sintered compact has a composition containing, in terms of mass ratio to a total mass, Ni which exceeds 10 mass % and is less than 20 mass %, Zn which exceeds 13 mass % and is less than 20 mass %, Sn which exceeds 0.5 mass % and is less than 3 mass %, a solid lubricant which exceeds 0.5 mass % and is less than 4 mass %, and P which is less than 0.05 mass % (or preferably less than 0.04 mass %), and having a remaining part composed of Cu and inevitable impurities.

As the solid lubricant, one of graphite, molybdenum disulfide, and boron nitride can be used. Alternatively, as the solid lubricant, two or more of graphite, molybdenum disulfide, and boron nitride can be mixed and used.

In particular, in the sintered compact, an average crystal particle diameter of crystal grains is 20 μm, or less. Here, the "average crystal particle diameter" means an average vale of particle diameters of the crystal grains revealed in an observation region arbitrarily set in the sintered compact.

In this embodiment, the average crystal particle diameter is calculated as follows. That is, first, resin is embedded in the sintered compact, and then a cross section of the sintered compact is polished by an automatic polisher. Subsequently, the polished cross section of the sintered compact is etched with an etchant, and 10 line segments each having a length of 200 μm are drawn on an image acquired by imaging at a predetermined magnification with the use of a microscope. Here, a value provided by subtracting a length of a pore from the length 200 μm is determined as a reference length. Then, each reference length is divided by the number of crystal grains present on the corresponding line segment to calculate an average value of particle diameters (which will be referred to as an "individual average value" hereinafter) of the crystal grains present on the corresponding line segment, Additionally, the individual average values calculated for the respective line segments are averaged for the 10 line segments to calculate the average crystal particle diameter.

Further, in the sintered compact, intercommunicating porosity is 8 to 18 volume %. Here, the "intercommunicating porosity" means a ratio of volumes of pores communicating with a surface of the sintered compact to a total volume of the sintered compact.

As the lubricant, it is possible, to use liquid paraffin, a mineral-based lubricant, a synthetic hydrocarbon-based lubricant, a silicone-based lubricant, a fluorine-based lubricant, or the like. It is to be rioted that the sintered hearing 20 may adopt a configuration impregnated with no lubricant, (Functions/Effects of Sintered Bearing 20)

A description will now be given on functions/effects of the sintered bearing 20.

The sintered hearing 20 is made of the sintered compact (a basis material) containing nickel silver (Cu—Ni—Zn) as a base. Consequently, the water resisting properties/corrosion resistance properties can be improved.

Further, in the sintered bearing 20, the solid lubricant is contained in the sintered compact, Consequently, sliding properties can be improved.

Furthermore, in the sintered bearing 20, Sn is contained in the sintered compact (a green compact). Consequently the sinterability can be enhanced, and the sintering strength can be improved. As a result, the sintering strength which is lowered due to addition of the solid lubricant can be complemented.

Moreover, in the sintered compact, since Sn is contained, dezincification corrosion resistance in water can be improved Additionally, in the sintered bearing 20, the porous structure is impregnated with the lubricant. Consequently, in a period from the bearing manufacture to the motor assembling and a period until the motor is used, the impregnating lubricant can prevent generation of rust on the bearing. Further, when the bearing portion is sealed and separated from a flow path of a liquid to be transported, an oil film can be formed between the bearing portion and the rotation shaft 32a in correspondence with the rotation of the rotation shaft 32a, and frictional resistance produced between the rotation shaft 32a and the bearing surface 21a can be reduced. Furthermore, even when the bearing portion is used in the liquid to be transported without being sealed, the lubricant with which the bearing is impregnated is eventually replaced by the liquid to be transported, but using the lubricant having higher viscosity than that of the liquid to be transported enables aiding in lubrication on the operation initial stage.

Especially, in the sintered bearing 20, P is not contained in the sintered compact. Alternatively, a content of P in the sintered compact is less than 0.05 mass % in terms of mass ratio to a total mass. Consequently, the crystal grains constituting the sintered compact can be micronized, whereby the mechanical strength and the vibration resisting properties can be improved. Moreover, in the sintered compact, the precipitation of the alloy layer of Ni—Sn—P is suppressed, and the rotation shaft 32a can be prevented from being damaged during the shaft rotation.

Additionally, in the sintered bearing 20, the average crystal particle diameter of the crystal grains constituting the sintered compact is 20 μm or less. Consequently, the mechanical strength and the vibration resisting properties are improved, and the mechanical strength and the vibration resisting properties required for the sintered bearing arranged in the motor of the liquid pump (in particular, a liquid pump mounted in an automobile) can be satisfied.

As descried above, according to the sintered bearing 20, the mechanical strength and the vibration resisting properties can be improved, and the rotation shaft can be prevented from being damaged.

A description will now be given below on functions/effects of each element constituting the sintered compact of the sintered bearing 20.

[About Ni (Nickel)]

Since Ni is contained in the sintered compact, water resisting properties/corrosion resisting properties can be improved.

On this occasion, when a content of Ni in the sintered compact becomes 10 mass % or less, the water resisting properties/corrosion resisting properties become insufficient. On the other hand, when the content of Ni in the sintered compact becomes 20 mass % or more, a material cost increases.

Thus, when the content of Ni in the sintered compact is set to exceed 10 mass % and become less than 20 mass %, the water resisting properties/corrosion resisting properties can be improved while suppressing an increase in material cost.

[About Zn (Zinc)]

Since Zn is contained in the sintered compact, the water resisting properties/corrosion resisting properties can be improved.

On this occasion, when a content of Zn in the sintered compact becomes 13 mass % or less, the water resisting properties/corrosion resisting properties become insufficient. On the other hand, when the content of Zn in the sintered compact becomes 20 mass % or more, the productivity is decreased due to evaporation of zinc at the time of sintering, and a risk of dezincification corrosion increases.

Thus, when the content of Zn in the sintered compact is set to exceed 13 mass % and become less than 20 mass %, the water resisting properties/corrosion resisting properties can be improved while suppressing a decrease in productivity.

In particular, Zn is a material which is cheaper than Ni. To improve the water resisting properties/corrosion resisting properties, increasing the content of Zn while suppressing an increase in content of Ni therefore enables suppressing an increase in material cost.

[About Sn (Tin)]

Since Sn is contained in the sintered compact (the green compact), the sinterability can be enhanced, and the sintering strength can be improved. Further, even if a contained amount is small, the dezincification corrosion can be suppressed.

On this occasion, when a contact of Sn in the sintered compact becomes 0.5 mass % or less, the above-described effects become insufficient. On the other hand, when the content of Sn in the sintered compact becomes 3 mass % or more, distortion due to a change in dimension at the time of sintering is readily produced.

Thus, when the content of Sn in the sintered compact is set to exceed 0.5 mass % and become less than 3 mass %, the sintering strength can be improved while suppressing production of the distortion.

[About Solid Lubricant]

Since the solid lubricant is contained in the sintered compact, the lubricity is enhanced, a friction coefficient can be decreased, and the seizing properties and the abrasion resisting properties can be improved.

On this occasion, when a content of the solid lubricant in the sintered compact becomes 0.5 mass % or less, the above-described effects become insufficient. On the other hand, when the content of the solid lubricant in the sintered compact becomes 4 mass % or more, the sintering strength is extremely lowered.

Thus, setting the content of the solid lubricant in the sintered compact to exceed 0.5 mass % and become less than 4 mass % enables improving the abrasion resisting properties while suppressing a decrease in the sintering strength.

[About P (Phosphorous)]

Since P is contained in the sintered compact, oxidation of metals composing the sintered compact can be avoided.

That is, as will be described later, when producing the material powder forming the sintered compact, it is preferred to use, as the material powder, alloy powder, e.g., the Cu—Ni—Zn—Sn alloy powder.

Here, the alloy powder, e.g., the Cu—Ni—Zn—Sn alloy powder is manufactured by an atomizing method or the like. Specifically, a molten metal in which various types of metals as raw materials composing the target alloy powder have been molten at high temperature is produced, and the produced molten metal is powdered by atomization/rapid solidification, thereby manufacturing the alloy powder.

At this moment, adding a small amount of P as a deoxidizer to the metals as raw materials enables avoiding oxidation of the molten metal.

Here, when a content of P in the metals as raw materials becomes 0.05 mass % or more, the crystal grains constituting the sintered compact are prone to coarsen at the time of sintering, and an alloy layer of Ni—Sn—P is readily precipitated in the sintered compact.

Thus, setting the content of P in the metals as raw materials (the sintered compact) to be less than 0.05 mass % enables avoiding the oxidation of the molten metal while suppressing the coarsening of the crystal grains constituting the sintered compact and the precipitation of the alloy layer of Ni—Sn—P in the sintered compact.

[About Average Crystal Particle Diameter]

When the average crystal particle diameter of the crystal grains constituting the sintered compact exceeds 20 μm, there is a risk that the mechanical strength and the vibration resisting properties required for the sintered bearing arranged in a motor of a liquid pump (a liquid pump mounted in an automobile in particular) are not met.

Hereupon, setting the average crystal particle diameter of the crystal grains constituting the sintered compact to 20 μm or less enables meeting the mechanical strength and the vibration resisting properties required for the sintered bearing arranged in a motor of a liquid pump (a liquid pump mounted in an automobile in particular).

[About Intercommunicating Porosity]

When the intercommunicating porosity becomes less than 8 volume %, extremely high density is achieved, a pressure required in compacting increases, and the productivity is lowered. On the other hand, when the intercommunicating porosity exceeds 18 volume % by, the strength of the green compact is lowered, and hence handling from the beginning to the sintering becomes difficult. Furthermore, since the sintering strength is lowered, the minimum strength required for the bearing cannot be obtained.

Thus, setting the intercommunicating porosity to 8 volume % or more and 18 volume % or less enables improving the sintering strength while suppressing a decrease in productivity.

(Method for Manufacturing Sintered Bearing 20)

A description will now be given on a method for manufacturing the sintered bearing 20.

To manufacture the sintered bearing 20, material powder is first produced.

The material powder is produced by stirring and mixing a plurality of types of powders (metal powders, the solid lubricant, and the like). At this moment, a mold lubricant may be added to the material powder.

The material powder has a composition containing, in terms of a mass ratio to a total mass, Ni which exceeds 10 mass % and is less than 20 mass %, Zn which exceeds 13 mass % and is less than 20 mass %, Sn which exceeds 0.5 mass % and is less than 3 mass %, and a solid lubricant which exceeds 0.5 mass % and is less than 4 mass %, and having a remaining part composed of Cu and inevitable impurities.

Alternatively, in the material powder, a small amount of P may be contained as a deoxidizer. On this occasion, a content of P in the material powder is less than 0.05 mass % or preferably less than 0.04 mass % in terms of mass ratio to a total mass.

That is, the material powder has a composition containing, in terms of a mass ratio to a total mass of the material powder, Ni which exceeds 10 mass % and is less than 20 mass %, Zn which exceeds 13 mass % and is less than 20 mass %, Sn which exceeds 0.5 mass % and is less than 3 mass %, a solid lubricant which exceeds 0.5 mass % and is less than 4 mass %, and P which is less than 0.05 mass % (or preferably less than 0.04 mas %), and having a remaining part composed of Cu and inevitable impurities.

To produce the material powder, it is possible to use a combination of one or more types of powders including Cu powder (pure metal powder), Ni powder (pure metal powder), Zn powder (pure metal powder), Sn powder (pure metal powder), Cu—Ni alloy powder, Cu—Zn alloy powder, Cu—Sn alloy powder, Cu—Ni—Zn alloy powder, Cu—Ni—Sn alloy powder, Cu—Ni—Zn—Sn alloy powder, and Cu—Ni—Zn—Sn—P alloy powder.

For example, producing the material powder with the use of the Cu powder, the Ni powder, the Cu—Zn alloy powder, and the Sn powder enables meeting the above-described composition.

Here, when the diffusion of Ni and Zn in the material powder is insufficient, concentrations of Ni and Zn become nonuniform in the sintered compact. As a result, portions in the sintered compact having low Ni and Zn concentrations are prone to corrode.

Thus, it is preferred for many of the metals included in the above-described composition in a metal powder (respective particles constituting the powder) state to be uniformly alloyed.

Therefore, it is desirable to reduce the types of metal powders to be used by using the alloy powder in which a plurality of metals are alloyed. Consequently, insufficient diffusion of Ni and Zn in the material powder can be suppressed.

Therefore, it is preferred for at least one type of alloy powder to be included in the powders used for producing the material powder. Alternatively, it is preferred for two or more types of alloy powders to be included in the powders used for producing the material powder. In particular, it is preferred for the alloy powder alone to be included in the powders used for producing the material powder without including the pure metal powders.

For example, when the Cu—Ni—Zn alloy powder and the Cu—Sn alloy powder are used for producing the material powder, the above-described composition can be met by the combination of the alloy powders.

In this embodiment, as the alloy powder used for producing the material powder, one type of alloy powder, i.e., the Cu—Ni—Zn—Sn alloy powder is used. Specifically, the Cu—Ni—Zn—Sn alloy powder and the solid lubricant are used to produce the material powder. Alternatively, the Cu—Ni—Zn—Sn—P alloy powder and the solid lubricant are used to produce the material powder. Consequently, it is possible to further assuredly suppress the insufficient diffusion of Ni and Zn in the material powder.

As the solid lubricant, one or more powders of black lead (graphite) powder, molybdenum disulfide powder, and boron nitride powder can be combined and used.

As the mold lubricant, powder of metallic soap, as typified by zinc stearate or lithium stearate, powder of fatty acid amide such as ethylene-bis-stearic amide, or powder of a wax-based lubricant such as polyethylene can be used. It is to be noted that the mold lubricant is not restricted to them.

Then, the material powder is compression-molded to form the green compact.

Specifically, the produced material powder is accommodated in a mold. Further, the material powder accommodated in the mold is press-molded under a pressure of 100 to 500 MPa to form the green compact.

Then, the green compact is sintered to form the sintered compact.

Specifically, the formed green compact is sintered in a predetermined atmosphere at a predetermined sintering temperature, and then cooled at a predetermined cooling speed to form the sintered compact. When the green compact is sintered, metal particles adjacent to each other are diffusionbonded, and the metal particles are coupled with each other to form the sintered compact (a sintered metal) having a porous constitution.

The predetermined atmosphere is a vacuum, a reducing gas (an ammonia decomposition gas, a hydrogen gas, an endothermic gas, or the like), an inert gas (a nitrogen gas, an argon gas, or the like), a mixed gas of these reducing gas and inert gas, or the like, and it is appropriately selected in correspondence with the composition of the material powder.

The sintering temperature is appropriately selected in the range of 700 to 1050° C. in correspondence with the composition of the material powder.

The predetermined cooling speed is set to 15° C./min or above and appropriately selected in correspondence with the composition of the material powder. In this embodiment, the cooling speed is set to 30° C./min. Consequently, the average crystal particle diameter of the sintered compact can be set to 20 μm or below.

Then, sizing is performed to the sintered compact.

Specifically, the formed sintered compact is accommodated in a mold. Further, the sizing (recompression) is performed to the sintered compact accommodated in the mold to form a recompressed body. Performing the sizing to the sintered compact enables improving a dimension accuracy and improving surface roughness.

Then, the recompressed body is cleaned to remove contamination such as metal chips produced by processing and a sizing lubricant.

Subsequently, the cleaned recompressed body is impregnated with the lubricant. Consequently, the sintered bearing 20 is brought to completion. It is to be noted that the sintered bearing 20 may not be impregnated with the lubricant.

(Functions/Effects of Method for Manufacturing Sintered Bearing 20)

In the method for manufacturing the sintered bearing 20, the sintered bearing is made of the material powder containing nickel silver (Cu—Ni—Zn) as a base. Consequently, the water resisting properties/corrosion resisting properties of the sintered bearing 20 can be improved.

Furthermore, in the method for manufacturing the sintered bearing 20, the solid lubricant is added in the material powder. Consequently, sliding properties of the sintered bearing 20 can be improved.

Moreover, in the method for manufacturing the sintered bearing 20, Sn is added in the material powder. Consequently, the sinterability in sintering can be enhanced, the sintering strength of the sintering bearing 20 can be improved, and the sintering strength which is decreased due to the addition of the solid lubricant can be thereby complemented.

Additionally, adding Sn in the material powder enables improving the dezincification corrosion resistance in water can be improved.

In the method for manufacturing the sintered bearing 20 in particular, P is not added in the material powder. Alternatively, an amount of P added in the material powder is less than 0.05 mas % in terms of mass ratio to a total mass.

Consequently, the crystal grains constituting the sintered compact can be micronized, and the mechanical strength and the vibration resisting properties can be thereby improved. Further, in the sintered compact, the precipitation of the alloy layer of Ni—Sn—P can be suppressed, and the rotation shaft can be prevented from being damaged during the shaft rotation.

Furthermore, in the method for manufacturing the sintered bearing 20, the average crystal particle diameter of the crystal grains constituting the sintered compact is 20 μm or less. Consequently, the mechanical strength and the vibration resisting properties can be improved, and the mechanical strength and the vibration resisting properties required for the sintered bearing arranged in a motor of a liquid pump (a liquid pump mounted in an automobile in particular) can be met.

Moreover, in the method for manufacturing the sintered bearing 20, the Cu—Ni—Zn—Sn alloy powder and solid lubricant powder are mixed to generate the material powder. Alternatively, the Cu—Ni—Zn—Sn—P alloy powder and the solid lubricant powder are mixed to generate the material powder. Consequently, in the sintered compact, concentration of each component such as Ni or Zn can be prevented from becoming nonuniform, whereby a situation where portions in the sintered compact having low concentrations of Ni and Zn are selectively corroded can be avoided.

As described above, according to the method for manufacturing the sintered bearing 20, the mechanical strength and the vibration resisting properties can be improved, and the rotation shaft can be prevented from being damaged.

Here, the functions/effects of each component (each element) constituting the material powder are as described above.

EXAMPLES

A description will now be given on examples of the present invention.

As examples of the present invention, four types of sintered bearings (Examples 1 to 4) were manufactured. Additionally, as comparative examples, four types of sintered bearings (Comparative Examples 1 to 4) were manufactured.

The sintered bearings according to Examples 1 to 4 were manufactured with the use of material powders having compositions according to the present invention. Consequently, the sintered compacts of the sintered bearings according to Examples 1 to 4 have the compositions according to the present invention.

That is, each of the sintered compacts of the sintered bearing according to Examples 1 to 3 has a composition containing, in terms of a mass ratio to a total mass of the material powder (the sintered compact), Ni which exceeds 10 mass % and is less than 20 mass %, Zn which exceeds 13 mass % and is less than 20 mass %, Sn which exceeds 0.5 mass % and is less than 3 mass %, and the solid lubricant which exceeds 0.5 mass % and is less than 4 mass %, and having a remaining part composed of Cu and inevitable impurities.

On the other hand, the sintered compact of the sintered bearing according to Example 4 has a composition containing, in terms of a mass ratio to a total mass of the material powder (the sintered compact), Ni which exceeds 10 mass % and is less than 20 mass %, Zn which exceeds 13 mass % and is less than 20 mass %, Sn which exceeds 0.5 mass % and is less than 3 mass %, the solid lubricant which exceeds 0.5 mass % and is less than 4 mass %, and P which is less than 0.05 mass %, and having a remaining part composed of Cu and inevitable impurities.

Further, in the sintered bearings according to Examples 1 to 4, combinations of the powders used for the generation of the material powder are different from each other.

On the other hand, the sintered bearings according to Comparative Examples 1 to 4 are manufactured with the use of the material powders having compositions different from those according to the present invention. Consequently, the sintered compacts of the sintered bearings according to Comparative Examples 1 to 4 have compositions different from those according to the present invention. Specifically, each of the sintered compacts (the material powders) of the sintered bearings according to Comparative Examples 1 to 4 is constituted to contain P which is 0.05 mass % or more in terms of mass ratio to a total mass of the sintered compact (the material powder).

Furthermore, in the sintered bearings according to Comparative Examples 1 to 4, combinations of the powders used for the generation of the material powders are different from each other.

Here, the sintered bearings according to Examples 1 to 4 and the sintered bearings according to Comparative Examples 1 to 4 are manufactured under the same manufacturing conditions (a manufacturing process, a pressure when forming the green compacts, an atmosphere/sintering temperature/cooling speed when forming the sintered compacts, and others).

Specifically, the material powder accommodated in a mold is press-formed under a pressure of 100 to 500 MPa to form the green compact. Moreover, the green compact is sintered in an ammonia decomposition gas at a sintering temperature of 800 to 950° C., and then cooled at a cooling speed of 30° C./min to form the sintered compact.

A detailed description will now be given below as to comparison results of the sintered bearings according to Examples 1 to 4 and the sintered bearings according to Comparative Examples 1 to 4.

(Composition of Each Sintered Bearing)

FIG. 3 is a view comparing compounding contents of the material powders of sintered bearings according to Examples 1 to 4 with compounding contents of the material powders of the sintered bearings according to Comparative Examples 1 to 4.

It is to be noted that each numerical figure shown in FIG. 3 denotes a ratio of a mass of each powder (alloy powder or a solid lubricant) to a total mass of each material powder (unit: mass %).

Moreover, the composition of each material powder is represented using mass %. For example, Cu-14Ni-14Zn-2Sn alloy powder means alloy powder which contains 14 mass % Ni, 14 mass % Zn, and 2 mass % Sn and has a remaining part consisting of Cu. This can be likewise applied to other alloy powders.

Each of the material powders of the sintered bearings according to Examples 1 to 3 is made of the Cu-14Ni-14Zn-2Sn alloy powder and graphite powder (a solid lubricant).

The material powder of the sintered bearing according to Example 4 is made of Cu-14Ni-14Zn-2Sn-0.03P alloy powder and the graphite powder (the solid lubricant).

On the other hand, each of the material powders of the sintered bearings according to Comparative Examples 1 to 3 is made of Cu-18Ni-18Zn alloy powder, Cu-11Sn alloy powder, Cu-8P alloy powder, and the graphite powder (the solid lubricant).

Additionally, the material powder of the sintered bearing according to Comparative Example 4 is made of the Cu-18Ni-18Zn alloy powder, the Cu-8P alloy powder, and the graphite powder (the solid lubricant).

Specifically, as shown in FIG. 3, the material powder of the sintered bearing according to Example 1 is generated by stirring and mixing the Cu-14Ni-14Zn-2Sn alloy powder which is 97.5 mass % and the graphite powder which is 2.5 mass % in terms of mass ratio to a total mass of the material powder (the sintered compact).

The material powder of the sintered bearing according to Example 2 is generated by stirring and mixing the Cu-14Ni-14Zn-2Sn alloy powder which is 96.5 mass % and the graphite powder which is 3.5 mass % in terms of mass ratio to a total mass of the material powder (the sintered compact).

The material powder of the sintered bearing according to Example 3 is generated by stirring and mixing the Cu-14Ni-14Zn-2Sn alloy powder which is 99.4 mass % and the graphite powder which is 0.6 mass % in terms of mass ratio to a total mass of the material powder (the sintered compact).

The material powder of the sintered bearing according to Example 4 is generated by stirring and mixing the Cu-14Ni-14Zn-2Sn-0.03P alloy powder which is 97.5 mass % and the graphite powder which is 2.5 mass % in terms of a mass ratio to a total mass of the material powder (the sintered compact).

The material powder of the sintered bearing according to Comparative Example 1 is generated by stirring and mixing the Cu-18Ni-18Zn alloy powder which is 75.5 mass %, the Cu-11Sn powder which is 20.0 mass %, the Cu-8P alloy powder which is 2.0 mass %, and the graphite powder which is 2.5 mass % in terms of mass ratio to a total mass of the material powder (the sintered compact).

The material powder of the sintered bearing according to Comparative Example 2 is generated by stirring and mixing the Cu-18Ni-18Zn alloy powder which is 73.5 mass %, the Cu-11Sn alloy powder which is 20.0 mass %, the Cu-8P alloy powder which is 2.0 mass %, and the graphite powder which is 4.5 mass % in terms of mass ratio to a total mass of the material powder (the sintered compact).

The material powder of the sintered bearing according to Comparative Example 3 is generated by stirring and mixing the Cu-18Ni-18Zn alloy powder which is 50.0 mass %, the Cu-11Sn alloy powder which is 45.5 mass %, the Cu-8P alloy powder which is 2.0 mass %, and the graphite powder which is 2.5 mass % in terms of mass ratio to a total mass of the material powder (the sintered compact).

The material powder of the sintered bearing according to Comparative Example 4 is generated by stirring and mixing the Cu-18Ni-18Zn alloy powder which is 93.5 mass %, the Cu-8P alloy powder which is 4.0 mass %, and the graphite powder which is 2.5 mass % in terms of mass ratio to a total mass of the material powder (the sintered compact).

FIG. 4 is a view comparing compositions of the material powders (sintered compacts) of the sintered bearings according to Examples 1 to 4 with compositions of the material powders (sintered compacts) of the sintered bearings according to Comparative Examples 1 to 4.

It is to be noted that each numerical figure shown in FIG. 4 denotes a ratio of a mass of each element (alloy powder or a solid lubricant) to a total mass of the material powder (unit: mass %).

As shown in FIG. 4, the composition of the material powder of the sintered bearing according to Example 1 consists of 68.3 mass % of Cu, 13.7 mass % of Ni, 13.7 mass % of Zn, 2.0 mass % of Sn, and 2.5 mass % of C in terms of mass ratio to a total mass of the material powder.

The composition of the material powder of the sintered bearing according to Example 2 consists of 67.6 mass % of Cu, 13.5 mass % of Ni, 13.5 mass % of Zn, 1.9 mass % of Sn, and 3.5 mass % of C in terms of mass ratio to a total mass of the material powder.

The composition of the material powder of the sintered bearing according to Example 3 consists of 69.6 mass % of Cu, 13.9 mass % of Ni, 13.9 mass % of Zn, 2.0 mass % of Sn, and 0.6 mass % of C in terms of mass ratio to a total mass of the material powder.

The composition of the material powder of the sintered bearing according to Example 4 consists of 68.3 mass % of Cu, 13.7 mass % of Ni, 13.7 mass % of Zn, 2.0 mass % of Sn, 0.03 mass % of P, and 2.5 mass % of C in terms of mass ratio to a total mass of the material powder.

The composition of the material powder of the sintered bearing according to Comparative Example 1 consists of 68.0 mass % of Cu, 13.6 mass % of Ni, 13.6 mass % of Zn, 2.2 mass % of Sn, 0.2 mass % of P, and 2.5 mass % of C in terms of mass ratio to a total mass of the material powder.

The composition of the material powder of the sintered bearing according to Comparative Example 2 consists of 66.7 mass % of Cu, 13.2 mass % of Ni, 13.2 mass % of Zn, 2.2 mass % of Sn, 0.2 mass % of P, and 4.5 mass % of C in terms of mass ratio to a total mass of the material powder.

The composition of the material powder of the sintered bearing according to Comparative Example 3 consists of 74.3 mass % of Cu, 9.0 mass % of Ni, 9.0 mass % of Zn, 5.0 mass % Sn, 0.2 mass % of P, and 2.5 mass % of C in terms of mass ratio to a total mass of the material powder.

The composition of the material powder of the sintered bearing according to Comparative Example 4 consists of 63.5 mass % of Cu, 16.8 mass % of Ni, 16.8 mass % of Zn, 0.3 mass % of P, and 2.5 mass % of C in terms of mass ratio to a total mass of the material powder.

(Metal Structure of Each Sintered Bearing)

Figure 5:
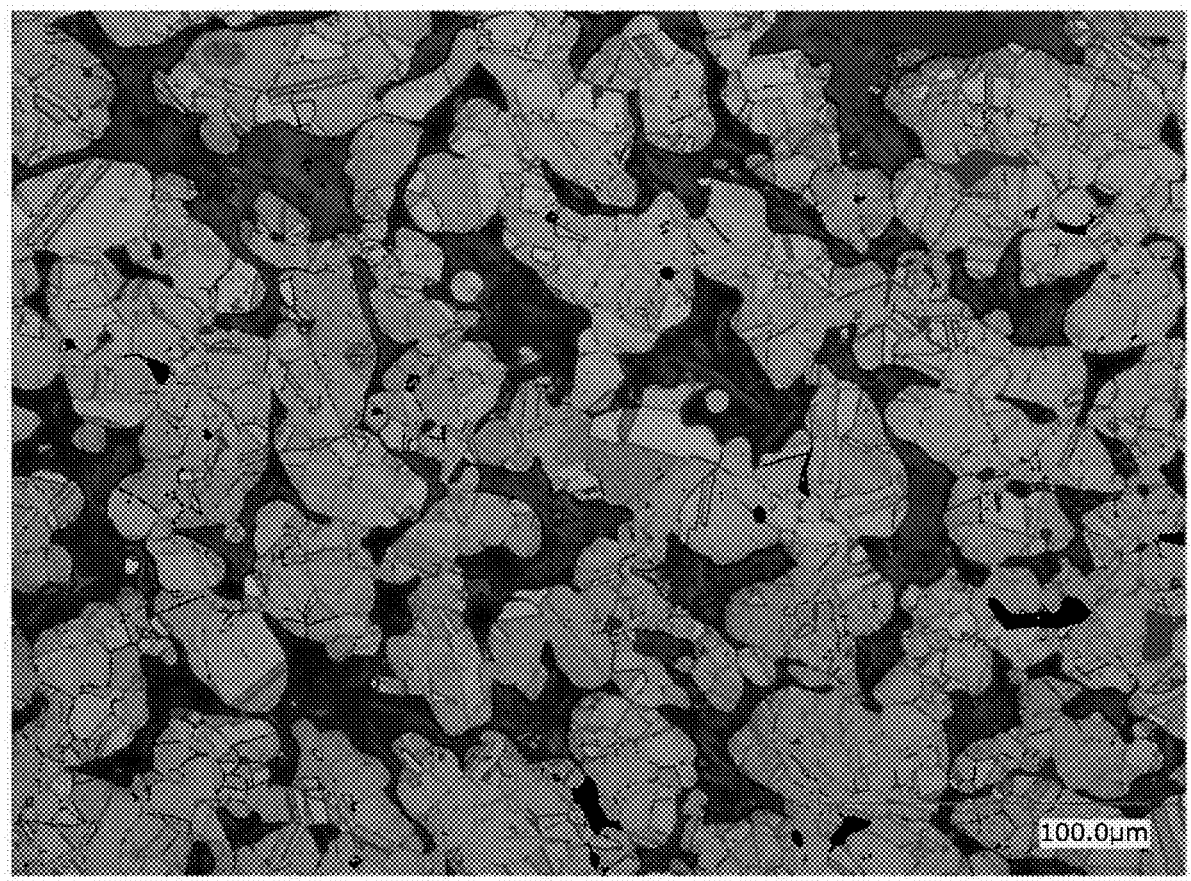
FIG. 5 is a view showing an example of metal structures of the sintered bearings according to the examples.
Figure 6:
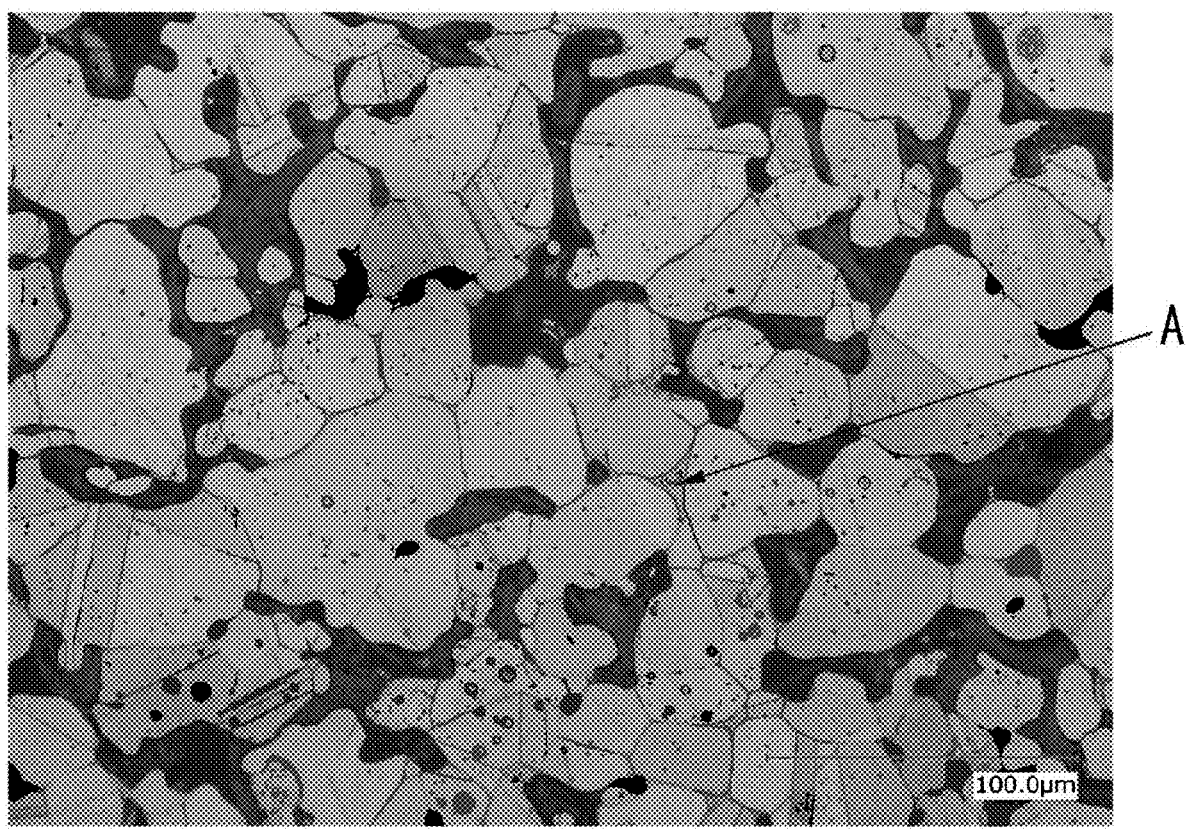
FIG. 6 is a view showing an example of metal structures of the sintered bearings according to the comparative examples.

FIG. 5 is a view showing an example of metal structures of the sintered bearings according to the examples. FIG. 6 is a view showing an example of metal structures of the sintered bearings according to the comparative examples.

Each sintered bearing according to Examples 1 to 4 and Comparative Examples 1 to 4 was immersed an etchant, and a metal structure after etching was observed by a microscope. A metal structure of the sintered bearing according to Example 1 is shown in FIG. 5 as one of the examples, and a metal structure of the sintered bearing according to Comparative Example 1 is shown in FIG. 6 as one of the comparative examples.

FIG. 5 shows a photograph provided by observing the metal structure of the sintered bearing according to Example 1 after the etching with the use of the microscope.

FIG. 6 shows a photograph provided by observing the metal structure of the sintered bearing according to Comparative Example 1 after the etching with the use of the microscope.

Further, in FIG. 6, the Ni—Sn—P alloy layer is denoted by a reference sign "A". As shown in FIG. 6, it can be understood that the Ni—Sn—P alloy layer is precipitated in the metal structure of the sintered bearing according to Comparative Example 1. Consequently, in the sintered bearing according to Comparative Example 1, the rotation shaft may be damaged at the time of shaft rotation.

On the other hand, as shown in FIG. 5, it can be understood that the alloy layer of Ni—Sn—P is not precipitated in the metal structure of the sintered bearing according to Example 1. Consequently, in the sintered bearing according to Example 1, the rotation shaft can be prevented from being damaged at the time of shaft rotation.

Figure 7:
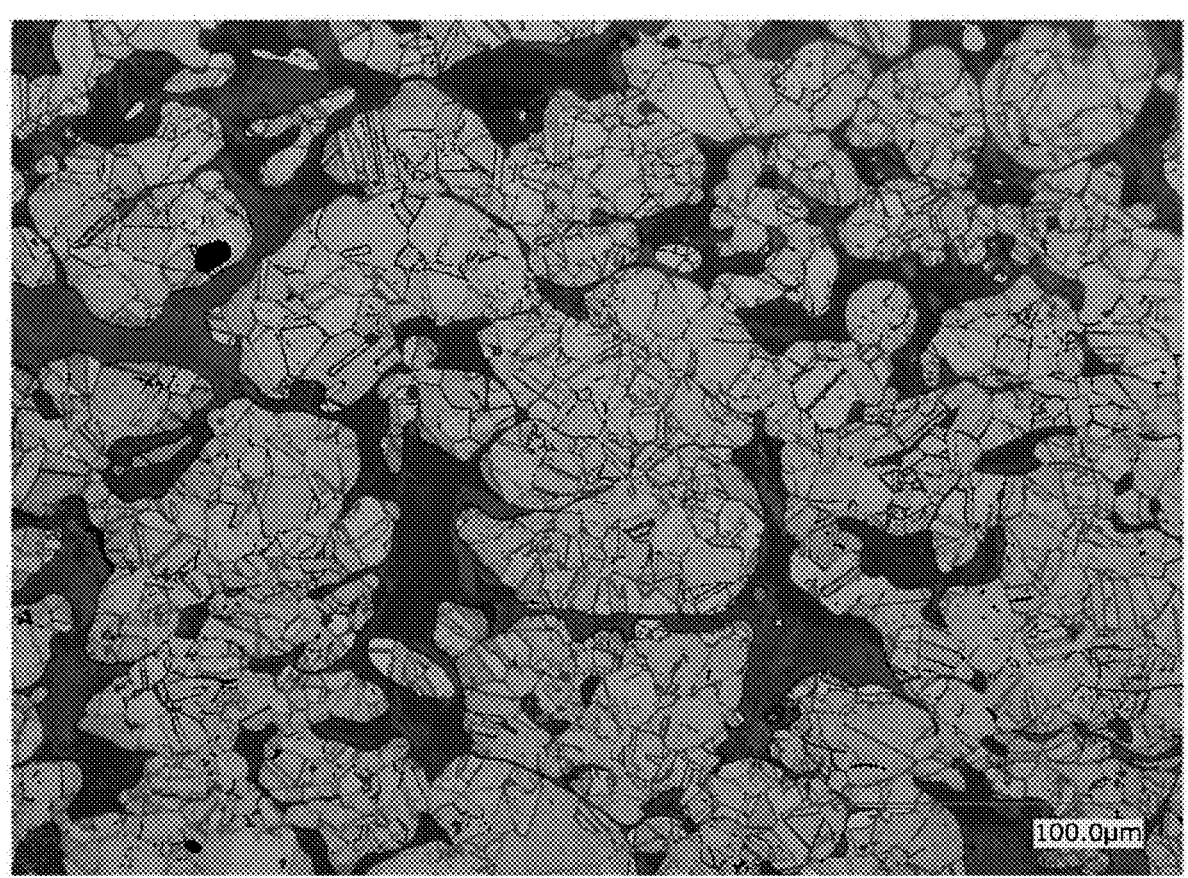
FIG. 7 is a view showing a metal structure of the sintered bearing according to Example 4.

Furthermore, FIG. 7 shows a photograph provided by observing the metal structure of the sintered bearing according to Example 4 after the etching with the use of the microscope. As shown in FIG. 4, the composition of the material powder of the sintered bearing according to Example 4 contains 0.03 mass % of P in terms of mass ratio to a total mass of the material powder. However, as shown in FIG. 7, in the metal structure of the sintered bearing according to Example 4, it can be understood that the Ni—Sn—P alloy layer is not precipitated. Consequently, according to the sintered bearing of Example 4, the rotation shaft can be prevented from being damaged at the time of shaft rotation.

Moreover, as shown in FIG. 5 to FIG. 7, it can be understood that an average crystal particle diameter of the sintered bearing according to each of Example 1 and 4 is smaller than an average crystal particle diameter of the sintered bearing according to Comparative Example 1.

Specifically, the average crystal particle diameter of the sintered bearing according to Example 1 was confirmed to be 8.1 μm, and the average crystal particle diameter of the sintered bearing according to Example 2 was confirmed to be 8.7 μm. The average crystal particle diameter of the sintered bearing according to Example 3 was confirmed to be 8.5 μm, and the average crystal particle diameter of the sintered bearing according to Example 4 was confirmed to be 8.3 μm.

On the other hand, the average crystal particle diameter of the sintered bearing according to Comparative Example 1 was confirmed to be 28.4 μm, and the average crystal particle diameter of the sintered bearing according to Comparative Example 2 was confirmed to be 27.8 μm. The average crystal particle diameter of the sintered bearing according to Comparative Example 3 as confirmed to be 28.6 μm, and the average crystal particle diameter of the sintered bearing according to Comparative Example 4 was confirmed to be 33.4 μm.

Thus, it can be understood that the average crystal particle diameters of the sintered bearings according to Examples 1 to 4 are 20 μm or less. On the other hand, it can be understood that the average crystal particle diameters of the sintered bearings according to Comparative Examples 1 to 4 exceed 20 μm.

Consequently, according to the sintered bearings of Examples 1 to 4, the mechanical strength and the vibration resisting properties become higher than those of the sintered bearings according to Comparative Examples 1 to 4.

(Results of Concentration Analysis of Each Chemical Element)

FIG. 8 show results of analyzing a cross section of the sintered bearing according to Example 1 by EDX (Energy Dispersive X-ray spectrometry).

In FIG. 8, distributions of the respective constituent elements (Cu, Ni, Zn, Sn) in the cross section of the sintered bearing according to Example 1 are mapped. In particular, in FIG. 8, the concentration (mass concentration %) of each constituent element (Cu, Ni, Zn, Sn) in the cross section of the sintered bearing according to Example 1 is indicated by a color difference (a tint difference). It is to be noted that, in FIG. 8, a lighter color represents higher concentration.

Figure 8C:
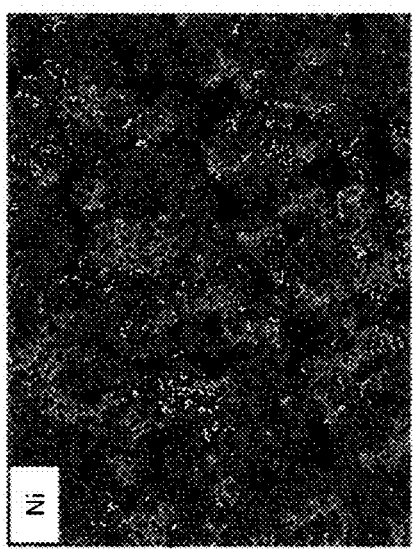
FIGS. 8(a)-8(e) shows results of Example 1 as an example of analyzing a cross sectional of the sintered bearing by EDX.
Figure 8E:
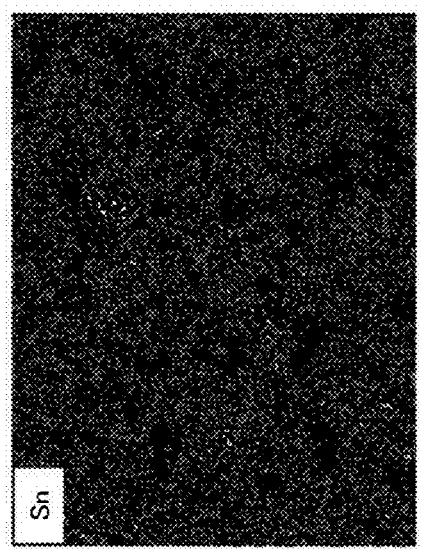
Figure 8B:
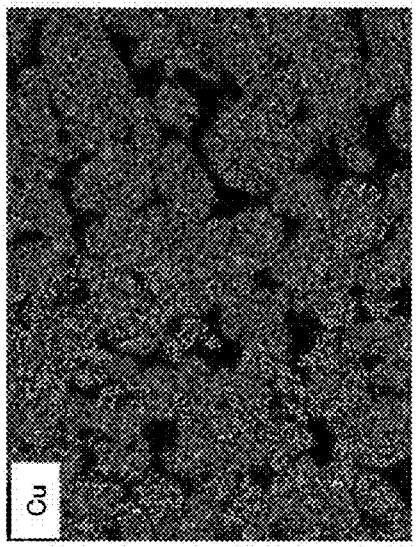
Figure 8D:
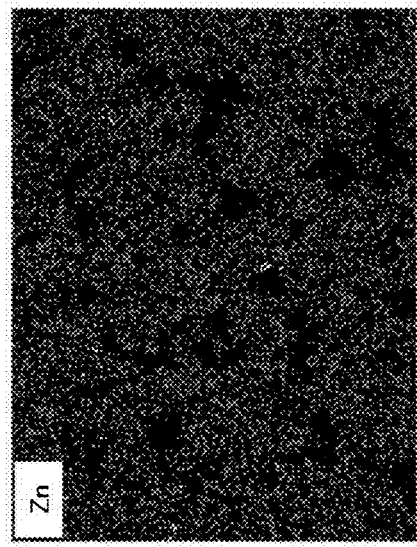
Figure 8A:
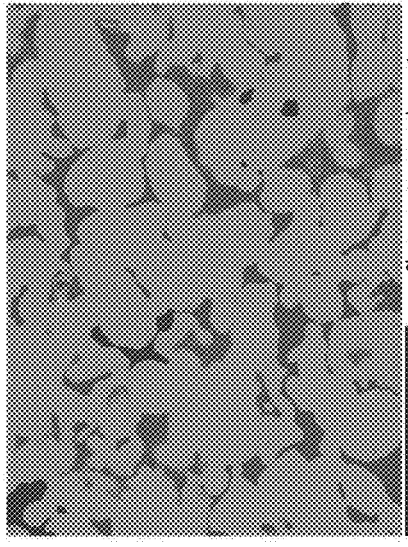

FIG. 8(b) shows a distribution of Cu in the cross section shown in FIG. 8 (a). FIG. 8 (c) shows a distribution of Ni in the cross section shown in FIG. 8 (a). FIG. 8 (d) shows a distribution of Zn in the cross-section shown in FIG. 8 (a). FIG. 8(e) shows a distribution of Sn in the cross section shown in FIG. 8 (a).

As shown in FIGS. 8 (b), (c), (d), and (e), it can be understood that, in the sintered bearing according to Example 1, the respective constituent elements (Cu, Ni, Zn, Sn) are uniformly dispersed.

Consequently, in the sintered bearing according to Example 1, generation of portions having low Ni and Zn concentrations is suppressed in the sintered compact and, as a result, a situation where the portions having the low Ni and Zn concentrations are selectively corroded can be avoided.

(Respective Characteristics of Sintered Bearing)

FIG. 9 is a view comparing characteristics of the sintered bearings according to Examples 1 to 4 with characteristics of the sintered bearings according to Comparative Examples 1 to 4.

It is to be noted that, in FIG. 9, superiority and inferiority of the respective characteristics (corrosion resisting properties, radial crushing strength, vibration resisting properties, a friction coefficient) are represented by symbols ("⊚", "○", "Δ", "×"). On this occasion, the respective symbols "⊚", "○", "Δ", and "×" mean that the characteristics are superior in the mentioned order. In particular, the characteristics with the symbol "×" mean that criteria required for the liquid pump bearing are not met.

As shown in FIG. 9, it can be understood that, as to the respective characteristics of the corrosion resisting properties, the radial crushing strength, the vibration resisting properties, and the friction coefficient, the sintered bearings according to Examples 1 to 4 meet the criteria required for the liquid pump bearings.

On the other hand, as shown in FIG. 4, in the material powder of the sintered bearing according to Comparative Example 1, since 0.2 mas % of P is added in terms of mass ratio to a total mass, the average crystal particle diameter of the sintered compact is as large as 28.4 μm, and it can be understood that the vibration resisting properties are insufficient as shown in FIG. 9. Further, as regards the corrosion resistance, since the Cu-18Ni-18Zn alloy powder and the Cu-11Sn alloy powder are used, it was confirmed that portions with low Ni or Zn concentration are selectively corroded.

Furthermore, as shown in FIG. 4, in the material powder of the sintered bearing according to Comparative Example 2, the content of C (the solid lubricant) is 4 mass % or more in terms of mass ratio to a total mass. Consequently, in the sintered bearing according to Comparative Example 2, the sintering strength is lowered. As a result, it can be understood that the radial crushing strength is insufficient in the sintered bearing according to Comparative Example 2 as shown in FIG. 9.

On the other hand, as shown in FIG. 4, in the material powder of the sintered bearing according to Comparative Example 3, the content of Ni is less than 10 mass % in terms of mass ratio to a total mass, and the content of Zn is less than 13 mass % in terms of mass ratio to the total mass. Consequently, as shown in FIG. 9, it can be understood that the corrosion resistance is insufficient in the sintered bearing according to Comparative Example 3.

Moreover, as shown in FIG. 4, in the material powder of the sintered bearing according to Comparative Example 3, the content of Sn is 3 mass % or more in terms of mass ratio to the total mass. Consequently, in the sintered bearing according to Comparative Example 3, a distortion due to a change in dimension at the time of sintering is apt to be produced, and the precipitation of the Ni—Sn—P alloy layer which becomes hard is facilitated. As a result, as shown in FIG. 9, it can be understood that, in the sintered bearing according to Comparative Example 3, the friction coefficient is high.

On the other hand, as shown in FIG. 4, in the sintered bearing according to Comparative Example 4, the content of P in the material powder is larger than those in the sintered bearings according to Comparative Examples 1 to 3. That is, in the material powder of the sintered bearing according to Comparative Example 4, the content of P is 0.3 mass % in terms of mass ratio to the total mass. Consequently, it can be understood that the average crystal particle diameter of the sintered compact is as large as 33.4 μm and the vibration resisting properties are insufficient. Additionally, as shown in FIG. 4, in the material powder of the sintered bearing according to Comparative Example 4, Sn is not contained. Consequently, in the sintered bearing according to Comparative Example 4, the sintering strength is lowered. As a result, it can be understood that the radial crushing strength is lowered in the sintered bearing according to Comparative Example 4 as shown in FIG. 9.

In particular, as shown in FIG. 4, in the sintered bearing according to Example 2, the content of C (the solid lubricant) in the material powder is larger than that in the sintered bearing according to Example 1. Consequently, as shown in FIG. 9, it can be understood that, in the sintered bearing according to Example 2, the friction coefficient is lower than that in the sintered bearing according to Example 1. Therefore, in case of prioritizing a reduction in the friction coefficient, the content of C (the solid lubricant) is preferably set to 3 mass % or above, or especially 3.5 mass % or above in the composition according to the present invention.

Additionally, as shown in FIG. 4, in the sintered bearing according to Example 3, the content of C (the solid lubricant) in the material powder is smaller than that of the sintered bearing according to Example 1. Consequently, as shown in FIG. 9, it can be understood that, in the sintered bearing according to Example 3, the radial crushing strength is improved as compared with that in the sintered bearing according to Example 1. Therefore, in case of prioritizing an improvement in the radial crushing strength, the content of C (the solid lubricant) is preferably set to 1 mass % or less in the composition according to the present invention.

REFERENCE SIGNS LIST 1 water pump
10 casing
20 sintered bearing
30 motor
40 impeller

The invention claimed is:

1. A sintered bearing consisting of:
   Ni in an amount exceeding 10 mass % and less than 20 mass %,
   Zn in an amount exceeding 13 mass % and less than 20 mass %,
   Sn in an amount exceeding 0.5 mass % and less than 3 mass %,
   a solid lubricant in an amount exceeding 0.5 mass % and less than 4 mass %, and
   a remaining part of Cu and inevitable impurities,
   wherein the sintered bearing has as an average crystal particle diameter of 20 μm or less.

2. The sintered bearing according to claim 1, wherein the solid lubricant contains boron nitride.

3. The sintered bearing according to claim 1, wherein the sintered bearing is used for a motor of a liquid pump.

4. A sintered bearing consisting of:
   Ni in an amount exceeding 10 mass % and less than 20 mass %,
   Zn in an amount exceeding 13 mass % and less than 20 mass %,
   Sn in an amount exceeding 0.5 mass % and less than 3 mass %,
   a solid lubricant in an amount exceeding 0.5 mass % and less than 4 mass %, P in an amount greater than 0 mass % and less than 0.05 mass %, and a remaining part of Cu and inevitable impurities, wherein the sintered bearing has an average crystal particle diameter of 20 μm or less.

* * * * *